US012052549B2

(12) United States Patent
Tachi et al.

(10) Patent No.: US 12,052,549 B2
(45) Date of Patent: Jul. 30, 2024

(54) SPEAKER

(71) Applicant: ALPS ALPINE CO., LTD., Tokyo (JP)

(72) Inventors: Ryosuke Tachi, Fukushima (JP); Masashi Kaneko, Niigata (JP); Tadashi Sakashita, Niigata (JP); Arata Tada, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 161 days.

(21) Appl. No.: 17/656,026

(22) Filed: Mar. 23, 2022

(65) Prior Publication Data

US 2022/0312135 A1 Sep. 29, 2022

(30) Foreign Application Priority Data

Mar. 25, 2021 (JP) ................................ 2021-051322

(51) Int. Cl.

*H04R 29/00* (2006.01)
*H04R 7/12* (2006.01)
*H04R 9/02* (2006.01)
*H04R 9/04* (2006.01)
*H04R 9/06* (2006.01)

(52) U.S. Cl.

CPC ............ *H04R 29/001* (2013.01); *H04R 7/12* (2013.01); *H04R 9/025* (2013.01); *H04R 9/046* (2013.01); *H04R 9/06* (2013.01)

(58) Field of Classification Search

CPC ........ H04R 29/001; H04R 7/12; H04R 9/025; H04R 9/046; H04R 9/06

See application file for complete search history.

(56) References Cited

U.S. PATENT DOCUMENTS 6,574,346 B1 6/2003 Tanaka
2006/0285704 A1 12/2006 Kitazawa et al.
2023/0057212 A1 * 2/2023 Toita ........................ H04R 9/06

FOREIGN PATENT DOCUMENTS

JP 2007-020153 1/2007

OTHER PUBLICATIONS

Extended European Search Report for EP22162943.9 mailed on Sep. 9, 2022.

* cited by examiner

*Primary Examiner* — Andrew Sniezek
(74) *Attorney, Agent, or Firm* — IPUSA, PLLC

(57) ABSTRACT

A speaker includes a yoke configured to form a magnetic circuit, a first magnet provided in a fixed manner, a voice coil provided in a gap through which a magnetic flux of the magnetic circuit is configured to pass, a diaphragm connected to the voice coil and configured to vibrate with the voice coil, a second magnet provided on a diaphragm unit including the voice coil and the diaphragm, and a magnetic sensor provided at a position through which both of a first magnetic flux generated by the first magnet and a second magnetic flux generated by the second magnet are configured to pass, wherein a direction of the first magnetic flux and a direction of the second magnetic flux are different from each other.

6 Claims, 2 Drawing Sheets

SPEAKER

CROSS-REFERENCE TO RELATED APPLICATIONS

This application is based on and claims priority to Japanese Patent Application No. 2021-051322, filed on Mar. 25, 2021, the entire content of which is incorporated herein by reference.

BACKGROUND OF THE INVENTION

1. Field of the Invention

The disclosures herein relate to a speaker.

2. Description of the Related Art

Conventionally, there is a speaker that detects the capacitance formed between a centerpole and a voice coil bobbin having a bobbin constituted by an insulator layer and a non-magnetic conductor layer and that outputs the detected capacitance as an electric signal. The detected capacitance is used to eliminate sound distortion in a motional feedback (MFB) circuit (for example, see Japanese Laid-Open Patent Publication No. 2007-020153).

Incidentally, a conventional speaker is designed such that the capacitance to be detected is less susceptible to disturbance noise, but change in the capacitance caused by the disturbance noise tends to be larger than the true detection value, which makes it difficult to detect the zero point, and therefore, the accuracy of detecting the position of the voice coil is not high enough to sufficiently eliminate the distortion of the sound in the MFB circuit.

SUMMARY OF THE INVENTION

It is a general object of the described embodiment to provide a speaker capable of detecting the position of the voice coil with a high degree of accuracy.

A speaker according to an aspect of the present disclosure includes a yoke configured to form a magnetic circuit, a first magnet provided in a fixed manner, a voice coil provided in a gap through which a magnetic flux of the magnetic circuit is configured to pass, a diaphragm connected to the voice coil and configured to vibrate with the voice coil, a second magnet provided on a diaphragm unit including, the voice coil and the diaphragm, and a magnetic sensor provided at a position through which both of a first magnetic flux generated by the first magnet and a second magnetic flux generated by the second magnet are configured to pass, wherein a direction of the first magnetic flux and a direction of the second magnetic flux are different from each other.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENT

In the following, an embodiment of the present invention will be described with reference to the accompanying drawings. In the specification and drawings, elements having substantially the same functions or configurations are denoted with the same numerals, and duplicate description thereof is omitted.

Hereinafter, an embodiment to which the speaker according to the present disclosure is applied is described.

Embodiment

Figure 1A:
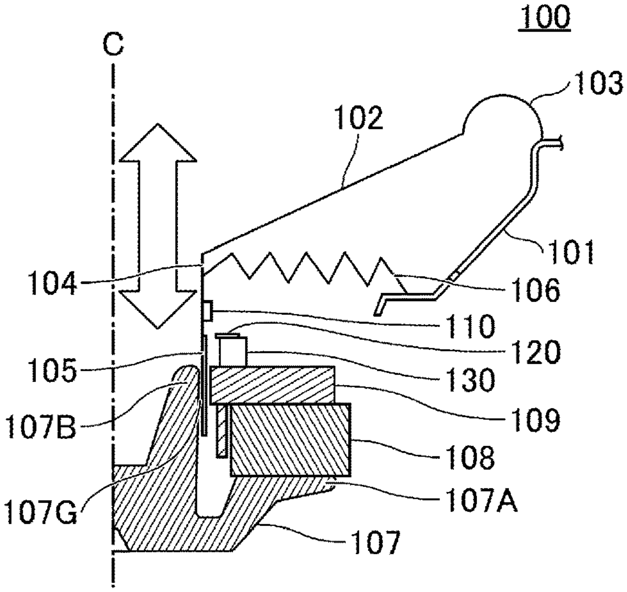
FIGS. 1A and 1B are drawings illustrating a speaker 100.
Figure 1B:
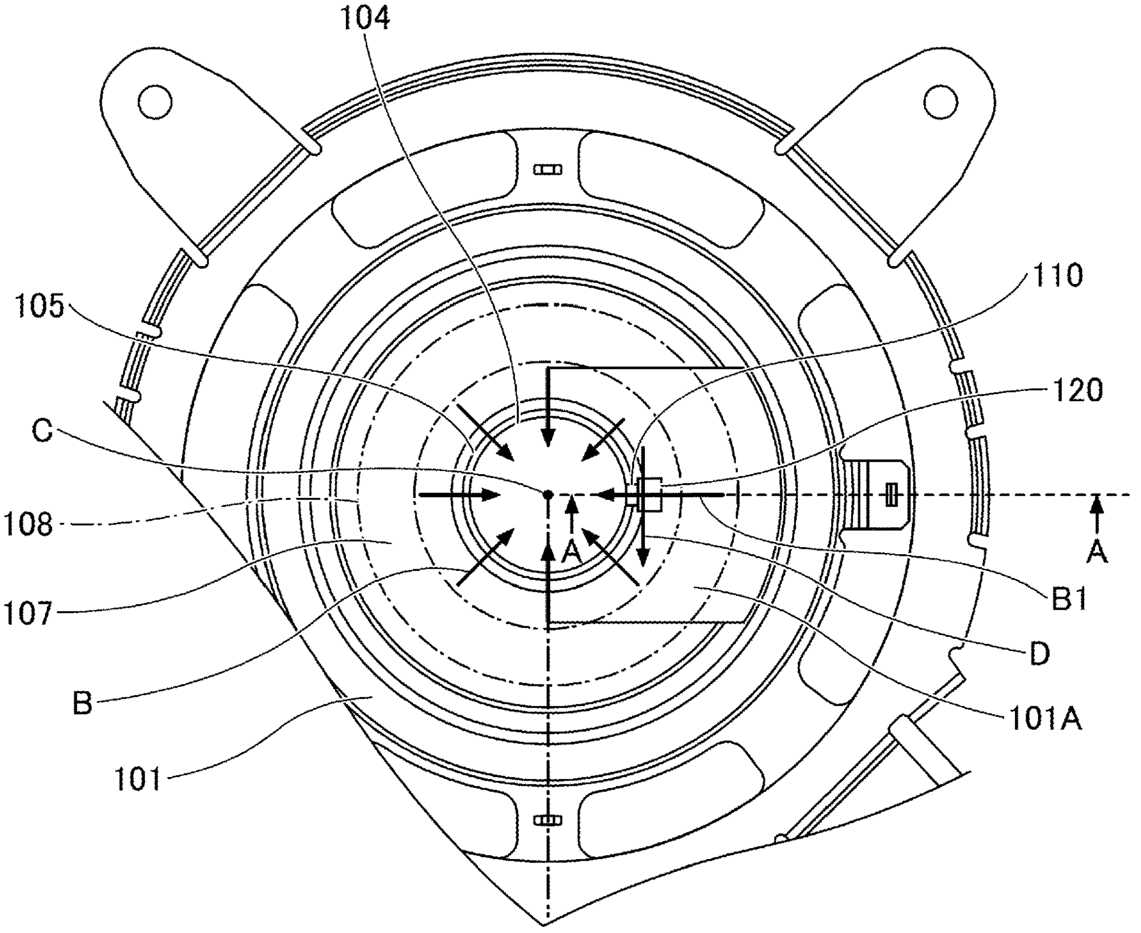

FIGS. 1A and 1B are drawings illustrating a speaker 100. FIG. 1A illustrates a cross-sectional view taken along line A-A of FIG. 1B. FIG. 1B is a plan view illustrating the speaker 100 as seen from the top side with a diaphragm and a damper removed. In this specification, a vertical direction is assumed to be defined based on the orientation of FIG. 1A, and the vertical direction is not intended to mean an absolute direction that is defined with reference to the direction of gravity. The upper surface side is a front side of the speaker 100, and is a side from which sound is output. The lower surface side is a rear side of the speaker 100.

Hereinafter, a term "plan view" is intended to mean a drawing in which an object in question is depicted as seen from the upper surface side or the lower surface side thereof. Also, it is assumed that terms such as perpendicular, orthogonal, vertical, upward, downward, and the like allow for deviation to such a degree that the effects of the embodiment are not impaired.

The speaker 100 includes a frame 101, a diaphragm 102, an edge 103, a bobbin 104, a voice coil 105, a damper 106, a yoke 107, a first magnet 108, a top plate 109, a second magnet 110, a magnetic sensor 120, and a base 130. The bobbin 104, the voice coil 105, and the diaphragm 102 are an example of a diaphragm unit. The speaker 100 is in a circular shape in a plan view, and FIG. 1A and FIG. 1B indicate a center axis C of the speaker 100.

The frame 101 is a housing of the speaker 100, and is made of metal or resin in a substantially conical shape. The frame 101 includes a holding unit 101A on the lower side as illustrated in FIG. 1B. The holding unit 101A is fixed to the upper surface of the top plate 109. In FIG. 1A, the holding unit 101A is omitted.

The diaphragm 102 is made of paper, resin, or a thin metal plate and is vibrated by vibration of the voice coil 105 in the vertical direction to generate sound. The diaphragm 102 is in a substantially conical shape as a whole, and in a plan view the diaphragm 102 is in a circular shape. The outer circumferential side of the diaphragm 102 is connected to the frame 101 via the edge 103 made of an elastic material such as rubber, and the inner circumferential side of the diaphragm 102 is connected to the bobbin 104. The center of the annular shape of the diaphragm 102 matches with the center axis C in a plan view.

The bobbin 104 is a cylindrical member made of paper, resin, or the like. A top end of the bobbin 104 is connected to the inner circumferential side of the diaphragm 102 and is connected to the inner circumferential side of the damper 106. The voice coil 105 is wound around the outer circumference of the lower portion of the bobbin 104, and the bobbin 104 and the voice coil 105 are inserted into a gap 107G, explained later, from the upper side. The center of the cylindrical shape of the bobbin 104 matches with the center axis C in a plan view. The bobbin 104 may be integrally formed with the inner circumferential side of the diaphragm 102.

The yoke 107 is provided on the rear side of the speaker 100. The yoke 107 is in a circular shape in a plan view, and is a member made of a magnetic material having an arm shape as illustrated in a cross-sectional view as illustrated in FIG. 1A. An end portion 107A of the yoke 107 on the outer circumference side holds the first magnet 108. A top end portion 107B on the inner circumferential side of the yoke 107 faces the inner circumferential surface of the top plate 109 with the gap 107G interposed therebetween. Specifically, the gap 107G in an annular shape that is a magnetic space is formed between the outer circumference surface of the top end portion 107B of the yoke 107 and the inner circumferential surface of the top plate 109. The center of the circular shape of the yoke 107 matches with the center axis C in a plan view.

The first magnet 108 is a permanent magnet in an annular shape as illustrated in FIG. 1B. The center of the annular shape of the first magnet 108 matches with the center axis C in a plan view. Of the first magnet 108, at least one of the upper surface side and the lower surface side is magnetized with the N pole, and the other is magnetized with the S pole. The magnetic flux generated by the first magnet 108 passes through the top plate 109, the gap 107G, and the yoke 107 and returns to the first magnet 108. At a height position in the vertical direction where the magnetic sensor 120 is situated, the direction of the magnetic flux generated by the first magnet is a direction toward the center axis C in a plan view, as illustrated by eight arrows B in a central portion of FIG. 1B. The magnetic flux generated by the first magnet 108 is an example of a first magnetic flux.

The top plate 109 is a member made of a magnetic material with an annular shape in a plan view, and is fixed to the top portion of the first magnet 108. The center of the annular shape of the top plate 109 matches with the center axis C in a plan view. The top plate 109, the yoke 107, and the first magnet 108 constitute a magnetic circuit.

The second magnet 110 is attached to a position higher than the voice coil 105 on the outer circumference surface of the bobbin 104. The second magnet 110 is attached to a single position in a circumferential direction of the bobbin 104, and is situated to face the magnetic sensor 120, explained later, in a plan view, and to overlap with the magnetic sensor 120 in the vertical direction. The second magnet 110 is a permanent magnet having the N pole and the S pole, and generates magnetic flux in a direction indicated by an arrow D. The magnetic flux of the second magnet 110 is an example of a second magnetic flux. The magnetic flux of the second magnet 110 is in a tangential direction of a circle formed by the outer circumference surface of the bobbin 104 in a plan view. In this case, of the magnetic flux generated by the first magnet 108, a direction of magnetic flux passing through the center of the second magnet 110 in a plan view is indicated by an arrow B1. A direction of the magnetic flux of the first magnet 108 indicated by the arrow B1 and a direction of the magnetic flux of the second magnet 110 indicated by the arrow D are orthogonal to each other in a plan view. The second magnet 110 may be smaller than the first magnet 108 because it is sufficient for the second magnet 110 to be able to provide magnetic flux of a predetermined density (a magnetic field of a predetermined strength) to the magnetic sensor 120 in order to detect the position of the voice coil 105.

The magnetic sensor 120 is provided on the top plate 109 with the base 130 interposed therebetween. The base 130 is provided to adjust the height of the magnetic sensor 120, and is made of, for example, resin. The magnetic sensor 120 is situated on a straight line connecting the center axis C and the center of the second magnet 110 in a plan view. Therefore, the position of the magnetic sensor 120 is a position where the direction of the magnetic flux of the first magnet 108 and the direction of the magnetic flux of the second magnet 110 cross each other at a right angle.

The magnetic sensor 120 is a sensor capable of detecting the direction of magnetic flux within a plane, and is provided so as to be able to detect the direction of magnetic flux within the plane perpendicular to the center axis C. When a current of an audio signal is passed through the voice coil 105, the bobbin 104 and the voice coil 105 vibrate in the direction of the center axis C as indicated by a double arrow, and accordingly, the magnetic sensor 120 can detect, within the plane perpendicular to the vibration direction of the bobbin 104 and the voice coil 105, the direction of a composite magnetic flux constituted by the magnetic flux of the first magnet 108 and the magnetic flux of the second magnet 110. The magnetic sensor 120 may be a sensor including a magneto resistance (MR) device such as, for example, an anisotropic magneto resistance (AMR) device, a giant magnetic resistance (GMR) device, a tunnel magneto resistance (TMR) device, or the like. In this case, for example, the magnetic sensor 120 is assumed to be a sensor including a GMR device.

Figure 2:
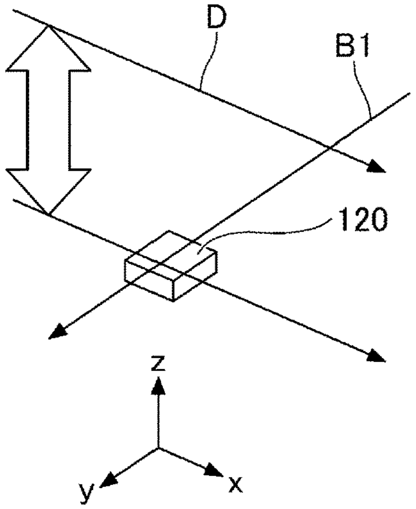
FIG. 2 is a drawing illustrating a magnetic sensor 120 and directions of magnetic fluxes.

FIG. 2 is a drawing illustrating the magnetic sensor 120 and the directions of the magnetic fluxes. FIG. 2 illustrates: a direction B1 of the magnetic flux, located at the position of the magnetic sensor 120, from among the magnetic fluxes of the first magnet 108; and a direction D of the magnetic fluxes of the second magnet 110. FIG. 2 illustrates XYZ coordinates of the orthogonal coordinate system. The X direction matches with the direction D, and the Y direction matches with the direction B1. The Z direction matches with the direction of the center axis C as illustrated in FIG. 1.

The voice coil 105 vibrations in the direction of the center axis C (Z direction), and accordingly, when the voice coil 105 is driven by an audio signal to vibrate in the Z direction, the second magnet 110 also vibrates in the Z direction. In this case, the direction D is assumed to be indicative of a particular magnetic flux generated by the second magnet 110, and when the second magnet 110 moves in the Z direction due to the vibration in the Z direction, the position of the particular magnetic flux changes in the Z direction as illustrated by a thick arrow in FIG. 2. The density of the magnetic flux of the second magnet 110 detected by the magnetic sensor 120 decreases as the second magnet 110 moves in the Z direction (the upward direction in FIG. 1A), and therefore, when the second magnet 110 moves in the Z direction due to the vibration in the Z direction, the density of the magnetic flux (the strength of the magnetic field) penetrating the magnetic sensor 120 in the X direction changes.

Because the magnetic sensor 120 is not attached to the diaphragm unit but is attached to the magnetic circuit (a fixed body side), the density of the magnetic flux (the strength of the magnetic field) of the first magnet 108 penetrating the magnetic sensor 120 in the Y direction is constant. Accordingly, when the density of the magnetic flux penetrating the magnetic sensor 120 in the X direction changes, the direction of the composite magnetic flux constituted by the magnetic flux of the first magnet 108 and the magnetic flux of the second magnet 110 in the XY plane passing through the magnetic sensor 120 changes. Therefore, the magnetic sensor 120 can detect a change in the direction of the composite magnetic flux due to vibration of the voice coil 105 in the Z direction.

The displacement of the voice coil 105 in the Z direction represents a displacement of the diaphragm 102, and therefore, the displacement of the diaphragm 102, the bobbin 104, and the voice coil 105 in the Z direction can be detected by detecting a change in the direction of the composite magnetic flux with the magnetic sensor 120. A configuration may be such that a relationship between the direction of the composite magnetic flux detected by the magnetic sensor 120 and the position or displacement of the voice coil 105 in the Z direction is measured in advance and obtained as data that is stored in a memory of a control unit constituted by a microcomputer or the like, and the position or displacement of the voice coil 105 in the Z direction corresponding to the direction of the composite magnetic flux detected by the magnetic sensor 120 is output. The control unit may be provided in the speaker 100, or may be provided outside of the speaker 100 and connected to the speaker from the outside.

The magnetic sensor 120 is a sensor that detects the direction of the magnetic flux (magnetic field) in the XY plane, and has such a property that the magnetic resistance changes in response to only the direction of the magnetic field. The magnetic resistance of the magnetic sensor 120 does not change in response to the magnitude of the magnetic field. Therefore, the magnetic sensor 120 is less susceptible to external noise and the like, and can detect the direction of the magnetic flux with a high degree of accuracy.

Therefore, the speaker 100 capable of detecting the position of the voice coil 105 with a high degree of accuracy can be provided. The position of the voice coil 105 can be detected with a high degree of accuracy, and therefore, when feedback control is performed using an output of a microcomputer indicative of the direction of the composite magnetic flux detected by the magnetic sensor 120 (an output indicative of the position or displacement of the voice coil 105 in the Z direction) in adaptive signal processing, distortion of sound with respect to an audio signal input to the voice coil 105 can be reduced.

The speaker 100 is a device that passively outputs audio in response to an audio signal output from the amplifier, and is a device that has a very large distortion and variation in the output in response to an audio signal and that is susceptible to damage due to over-vibration. In the past, a technique for feeding back the amplitude of the voice coil was studied, but a sensor capable of minimizing noise and the burden imposed on speaker was not available, and it was difficult to correct distortion of the output in response to an audio signal with a high degree of accuracy.

Examples of sensors tested in the past include a sensor detecting laser, light, an eddy current, or the like, a differential sensor, a moving coil, and the like, but all of these conventional sensors have problems in that the conventional sensors cannot accurately detect the position of the voice coil, noise is large, the burden imposed on a diaphragm member such as a bobbin or a voice coil is large, the sensors cannot withstand a temperature change, the cost is too high, and the like.

In contrast, the speaker 100 using the magnetic sensor 120 detecting the direction of the composite magnetic flux as described above has advantages in that the magnetic sensor 120 can accurately detect the position of the voice coil 105, noise is small, the burden imposed on the diaphragm member such as the bobbin 104 and the voice coil 105 is small, the magnetic sensor 120 can withstand a temperature change, and the cost is low.

Furthermore, because the first magnet 108 is a magnet for forming a magnetic circuit with the yoke 107, the speaker 100 capable of detecting the position of the voice coil 105 with a high degree of accuracy by using the existing magnet of the speaker 100 can be provided.

Furthermore, because the second magnet 110 is attached to the bobbin 104 around which the voice coil 105 is wound, the position of the voice coil 105 can be accurately detected by the second magnet 110, and the speaker 100 capable of detecting the position of the voice coil 105 with a high degree of accuracy can be provided.

Furthermore, because the position where the magnetic sensor 120 is provided is on the outer circumference side of the bobbin 104, the magnetic sensor 120 can be provided, without difficulty, in proximity to both of the first magnet 108 (the magnetic circuit) and the second magnet 110, and the speaker 100 capable of detecting the position of the voice coil 105 with a high degree of accuracy can be provided.

Because the magnetic sensor 120 detects a change in the direction of the composite magnetic flux constituted by the magnetic flux of the first magnet 108 and the magnetic flux of the second magnet 110 in a plane perpendicular to the vibration direction of the voice coil 105, the composite magnetic flux can be caused to reflect, to the greatest extent, displacement caused by vibration of the voice coil 105, and thus the detection accuracy of the position of the voice coil 105 is improved.

Furthermore, because, at the position where the magnetic sensor 120 is provided, the magnetic flux of the first magnet 108 and the magnetic flux of the second magnet 110 are orthogonal to each other, the composite magnetic flux can be caused to reflect, to the greatest extent, a change in the density of the magnetic flux of the second magnet 110 (a change in the strength of the magnetic field), and the detection accuracy of the position of the voice coil 105 is improved.

Figure 3:
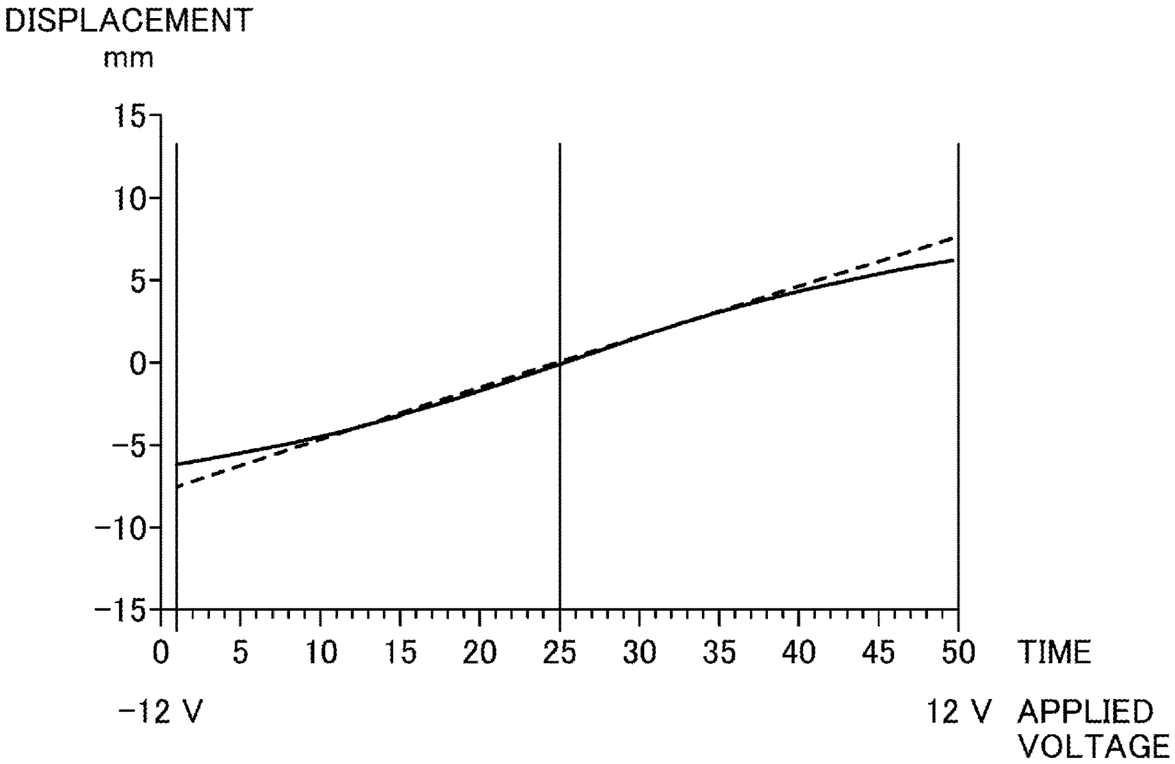
FIG. 3 is a drawing illustrating displacement of a voice coil 105 of the speaker 100 in response to a voltage applied to the voice coil 105.

FIG. 3 is a drawing illustrating displacement of the voice coil 105 of the speaker 100 in response to an applied voltage to the voice coil 105. When the absolute value of the applied voltage to the voice coil 105 increases, the absolute value of the current of the audio signal that is input to the voice coil 105 also increases, although not in a linear manner.

The property denoted with a broken line in FIG. 3 indicates a property obtained by correcting sound distortion with reference to the applied voltage by applying feedback control with adaptive signal processing on the basis of the direction of the composite magnetic flux detected by the magnetic sensor 120. The property denoted with a solid line in FIG. 3 indicates a property obtained by adjusting sound distortion with adaptive signal processing without applying feedback control on the basis of the direction of the composite magnetic flux detected by the magnetic sensor 120.

As illustrated in FIG. 3, it is understood that the property denoted with the solid line that is obtained without feedback control on the basis of the direction of the composite magnetic flux detected by the magnetic sensor 120 has a large distortion in an operation region in which the absolute value of the applied voltage is large, and the property denoted with the broken line obtained by performing feedback control on the basis of the direction of the composite magnetic flux detected by the magnetic sensor 120 is such that the displacement of the voice coil 105 linearly changes in response to the applied voltage.

Because the magnetic sensor 120 can detect the direction of the composite magnetic flux with a high degree of accuracy, distortion of displacement of the voice coil 105 in response to the applied voltage to the voice coil 105 can be corrected linearly in this manner. Therefore, the distortion rate of the displacement of the voice coil 105 can be improved.

Furthermore, because the displacement of the voice coil 105 can be detected with a high degree of accuracy on the basis of the direction of the composite magnetic flux detected by the magnetic sensor 120, the resonance of the voice coil 105 (the voice coil 105 and the diaphragm 102) can be controlled, and the vibration of the voice coil 105 in a range out of the resonance range can be controlled with a high degree of accuracy.

Furthermore, because the displacement of the voice coil 105 can be detected with a high degree of accuracy on the basis of the direction of the composite magnetic flux detected by the magnetic sensor 120, damage and the like of the diaphragm 102, the edge 103, the bobbin 104, the damper 106, and the like can be detected with a high degree of accuracy. In addition, when these members are damaged, an error can be provided by notification to the source of supply of an audio signal.

Furthermore, because the displacement of the voice coil 105 can be detected with a high degree of accuracy on the basis of the direction of the composite magnetic flux detected by the magnetic sensor 120, buffering of the diaphragm 102 may be electrically controlled without using the damper 106.

Furthermore, the displacement of the voice coil 105 can be detected with a high degree of accuracy on the basis of the direction of the composite magnetic flux detected by the magnetic sensor 120, so that the power that is input to an amplifier for amplifying an audio signal can be optimized, the input power to the amplifier can be reduced, and the size of the amplifier can be reduced.

Furthermore, because the displacement of the voice coil 105 can be detected with a high degree of accuracy on the basis of the direction of the composite magnetic flux detected by the magnetic sensor 120, distortion can be alleviated by feedback control based on position information of the voice coil 105.

Furthermore, because the displacement of the voice coil 105 can be detected with a high degree of accuracy on the basis of the direction of the composite magnetic flux detected by the magnetic sensor 120, damage to the speaker 100 caused by an excessive input can be alleviated, and the margin for the input signal to the speaker 100 can be reduced.

Although the second magnet 110 is attached to the bobbin 104 in the above explanation, the second magnet 110 may be attached to the voice coil 105. Also, the second magnet 110 may be attached to a portion that vibrates together with the voice coil 105, other than the bobbin 104 and the voice coil 105.

Furthermore, although the magnetic sensor 120 is provided on the base 130 provided on the top plate 109 in the above explanation, the magnetic sensor 120 may be provided anywhere on the fixed portion side such as the magnetic circuit, the frame 101, and the like so long as the magnetic sensor 120 is situated so as to be able to detect the magnetic flux of the second magnet 110.

Furthermore, in the above explanation, the position of the magnetic sensor 120 is a position where the direction of the magnetic flux of the first magnet 108 and the direction of the magnetic flux of the second magnet 110 cross each other at a right angle. However, so long as the magnetic sensor 120 can detect the direction of the composite magnetic flux, the direction of the magnetic flux of the first magnet 108 and the direction of the magnetic flux of the second magnet 110 do not have to cross each other at a right angle. So long as the direction of the magnetic flux of the first magnet 108 and the direction of the magnetic flux of the second magnet 110 are different, they may cross each other at any angle.

Furthermore, in the above explanation, the magnetic sensor 120 detects the direction of the composite magnetic flux constituted by the magnetic flux of the first magnet 108 and the magnetic flux of the second magnet 110 within the plane perpendicular to the vibration direction of the bobbin 104 and the voice coil 105. However, the plane within which the magnetic sensor 120 detects the direction of the composite magnetic flux constituted by the magnetic flux of the first magnet 108 and the magnetic flux of the second magnet 110 does not have to be perpendicular to the vibration direction of the bobbin 104 and the voice coil 105, and may cross the vibration direction at any angle. This is because, so long as the plane within which the magnetic sensor 120 detects the direction of the composite magnetic flux constituted by the magnetic flux of the first magnet 108 and the magnetic flux of the second magnet 110 cross the vibration direction at any angle, the magnetic sensor 120 can detect a change in the direction of the composite magnetic flux constituted by the magnetic flux of the first magnet 108 and the magnetic flux of the second magnet 110 caused by vibration of the bobbin 104 and the voice coil 105.

Furthermore, in the above explanation, the magnetic sensor 120 detects the direction of the composite magnetic flux constituted by the magnetic flux of the first magnet 108 and the magnetic flux of the second magnet 110, and the first magnet 108 is fixed, whereas the second magnet 110 moves in response to vibration of the bobbin 104 and the voice coil 105. However, instead of the first magnet 108 as explained above, a magnet may be provided as a first magnet in a fixed manner in the speaker 100, and the magnetic sensor 120 may detect the direction of the composite magnetic flux constituted by the magnetic flux of the first magnet and the magnetic flux of the second magnet 110. This is because the displacement of the voice coil 105 can be detected with a high degree of accuracy on the basis of the direction of the composite magnetic flux detected by the magnetic sensor 120. Alternatively, the magnetic sensor 120 may detect the direction of the composite magnetic flux of the magnetic flux of the magnet provided in a fixed manner in the speaker 100, the magnetic flux of the first magnet 108, and the magnetic flux of the second magnet 110.

According to the embodiment, the speaker capable of detecting the position of the voice coil with a high degree of accuracy can be provided.

Although the present invention has been described with reference to the embodiment, the present invention is not limited to the configurations and elements described in the embodiment, and the configurations and the elements described in the embodiment may be combined with other configurations and elements, and the above-described embodiment can be changed as appropriate without departing from the scope of the claimed subject matter.

What is claimed is:

1. A speaker comprising:

a yoke configured to form a magnetic circuit;

a first magnet provided in a fixed manner;

a voice coil provided in a gap through which a first magnetic flux of the magnetic circuit is configured to pass;

a diaphragm connected to the voice coil and configured to vibrate with the voice coil;

a second magnet provided on a diaphragm unit including the voice coil and the diaphragm; and a magnetic sensor provided at a position so as to detect a composite magnetic flux that are formed by the first magnetic flux generated by the first magnet and a second magnetic flux generated by the second magnet, wherein both of the first magnetic flux generated by the first magnet and the second magnetic flux generated by the second magnet pass through the position, and wherein a direction of the first magnetic flux is orthogonal to a direction of the second magnetic flux in plan view at the position where the magnetic sensor is provided.

2. The speaker according to claim 1, wherein the first magnet is configured to form the magnetic circuit with the yoke.

3. The speaker according to claim 1, wherein the diaphragm unit further includes a bobbin around which the voice coil is wound, and the second magnet is provided on one of the bobbin, the voice coil, or the diaphragm.

4. The speaker according to claim 3, wherein the magnetic sensor is provided is on an outer circumference side of the bobbin or the voice coil.

5. The speaker according to claim 1, wherein the magnetic sensor detects a change in a direction of a composite magnetic flux constituted by the first magnetic flux and the second magnetic flux within a plane that crosses a vibration direction of the diaphragm unit.

6. A speaker comprising:

a yoke configured to form a magnetic circuit;

a first magnet provided in a fixed manner;

a voice coil provided in a gap through which a first magnetic flux of the magnetic circuit is configured to pass;

a diaphragm connected to the voice coil and configured to vibrate with the voice coil;

a second magnet provided on a diaphragm unit including the voice coil and the diaphragm; and a magnetic sensor provided at a position through which both of the first magnetic flux generated by the first magnet and a second magnetic flux generated by the second magnet pass, wherein a direction of the first magnetic flux is orthogonal to a direction of the second magnetic flux in plan view at a position where the magnetic sensor is provided, and wherein the magnetic sensor is attached to the first magnet through a top plate that is made of a magnetic material and a base that is provided on the top plate and made of resin.

* * * * *